Aug. 6, 1968     J. N. SVYADOSCH ET AL     3,395,907
REACTOR FOR HYDROMETALLURGICAL PROCESSES
Filed Feb. 3, 1965                         2 Sheets-Sheet 1

United States Patent Office 3,395,907
Patented Aug. 6, 1968

3,395,907
REACTOR FOR HYDROMETALLURGICAL PROCESSES
Jury Nikolaevich Svyadosch, Pervomaiski, East Kazakhstan, and Jury Petrovich Lazarev and Mikhail Andreevich Melnichenko, Ust-Kamenogorsk, U.S.S.R., assignors to Ust-Kamenogorsky Svintsovo-Tsinkovy Kombinat imeni V.I. Lenina, Ust-Kamenogorsk, U.S.S.R.
Filed Feb. 3, 1965, Ser. No. 430,084
5 Claims. (Cl. 266—12)

ABSTRACT OF THE DISCLOSURE

A reactor for hydrometallurgical processes in which a casing having means for feeding initial materials and discharging finished products therefrom is provided with a rotor defined by a hollow shaft having separation discs mounted thereon with clearances between adjacent discs and at the points of mounting on the shaft the discs being provided with bores connecting the hollow part of the shaft to the clearances between the discs.

---

The present invention relates to a reactor for hydrometallurgical processes, and, more particularly to hydrometallurgy of non-ferrous, rare and precious metals.

The hydrometallurgy of non-ferrous, rare and precious metals is based on heterogeneous chemical reactions between a liquid reagent and a granular ore material. These reactions take place at the boundary of the liquid and solid phases. They are determined by the values of relationship between diffusion resistance, pressure, temperature and the weights of the reacting substances.

The apparatus used for hydrometallurgical processes are characterized by slow flow speeds of granular material and liquid reagent (5–7 m./sec.), and therefore the rate of the reactions is low, with low rates of overcoming diffusion resistances and slow changes of phase boundary. Hence, to provide for reactions of dissolution, oxidation, reduction, hydrolysis, cementation, etc., in hydrometallurgical processes, a great number of lixiviation, cementation and other apparatus of large volume is required.

The use of an autoclave type apparatus has but slightly intensified the hydrometallurgical processes, as it very insignificantly increased the rate of the phase boundary change, and no selective removal from the process of the reaction products separately from the reacting agents has been ensured.

All attempts to overcome the difficulties and improve the apparatus for hydrometallurgical processes, including the use of mechanisms intensifying mixing of the solid and liquid phases and use of ultrasonic oscillation emitters and other oscillators, have failed.

An object of the present invention is to make available a simple and reliable design of a continuous-action reactor for effecting reactions of the main hydrometallurgical processes at the phase boundary of the liquid reagent and solid granular ore material (dissolution, lixiviation, cementation, etc.).

Another object of the invention is to provide a reactor design for ensuring acceleration and rapid proceeding of reactions.

Still another object of the invention is to provide a reactor for ensuring continuous removal therefrom of the liquid reaction product, with the residue of the initial solid substances necessary for continuation of the process being automatically retained in the reactor.

Another of the objects of the present invention is to make available a reactor allowing the reactions to be effected with introduction of gas under pressure and with heating (oxidation, reduction, chlorination, etc.).

The above mentioned objects are achieved by the provision of a reactor provided with a rotor coaxially disposed within a casing thereof, said rotor being a hollow shaft having longitudinal notches along its surface connecting with radial holes leading to the hollow center. Separation discs are mounted on the shaft with clearances therebetween, and at their points of attachment to the shaft the discs having bores connecting the hollow part of the shaft through the radial holes, longitudinal notches and bores with the clearances between the discs. The clearance between the discs is controlled by intermediate rings. A small turbine providing for a counterpressure during rotation of the separation discs is mounted on the hollow shaft on that end at which the raw materials are charged into the reaction.

The essence of the invention will now be explained by reference to the accompanying drawings, in which.

Figure 1:
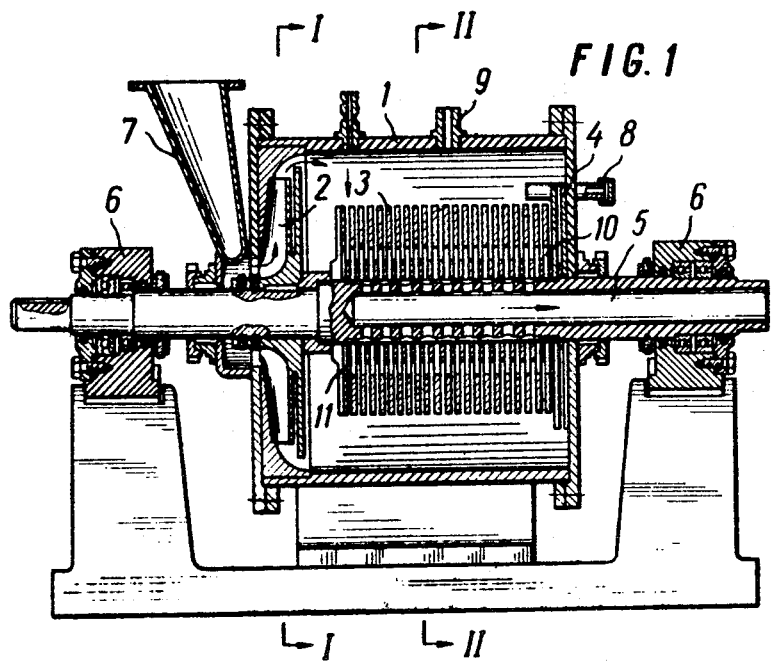
FIG. 1 is a view in longitudinal elevation and partly in cross section of the reactor of the invention.
Figure 2:
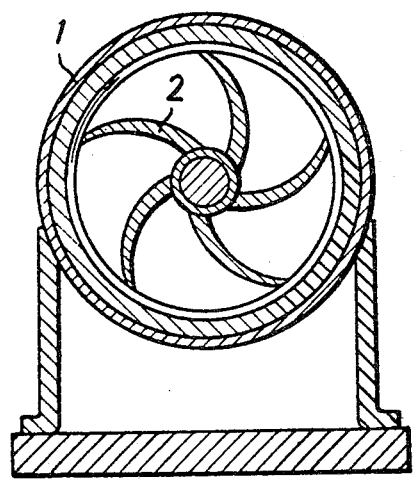
FIG. 2 is a view taken along I—I of FIG. 1 the view looking in the direction of the arrows.
Figure 3:
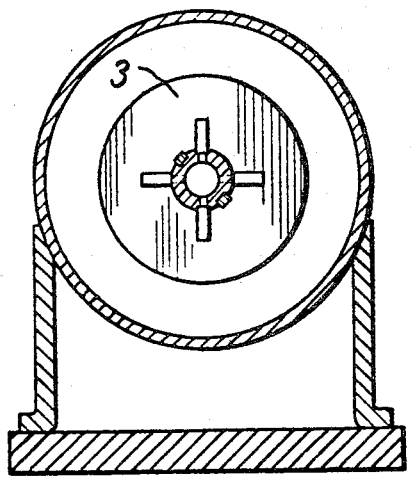
FIG. 3 is a view taken along II—II of FIG. 1.

The reactor comprises a cylindrical casing 1 closed at both sides by flat covers provided with openings for a rotor shaft.

A rotor is installed within the casing and includes a working turbine 2, separation discs 3, a repelling turbine 4, and a hollow shaft 5 carried by supporting thrust bearings 6 located exteriorly of the casing. At the points where the discs are fitted to the shaft, bores 10 are provided in the discs and are aligned with the longitudinal notches in said shaft, which notches connect with radial holes which lead to the center of the shaft. The hollow of the shaft is connected through said radial holes, longitudinal notches and said bores with the clearances between the discs.

The solution or pulp is fed into the apparatus through a feeding means 7 connected to a chamber at the entry to the turbine. The reactor rotor within the casing is driven by a motor at a specified rotational speed. The through openings in the covers of the reactor casing for receiving the shaft 5 are sealed by means of packings or labyrinths and the discs 3 are separated from each other by rings 11 located between or intermediate adjacent discs.

The size of the apparatus and the relation between its length and the diameter of the casing are specified depending on the unit productivity and required production volume.

The reactor operation principle is based on utilizing centrifugal forces for the reduction of diffusion resistances and continuous removal of the reaction products from the process, with the raw materials being continuously replenished to retain the amount necessary for a reaction.

The reactor operates as follows: A solution or pulp containing reacting substances admitted through the feeding means 7 is delivered to the working turbine 2 which, by rotation, creates a certain pressure within the reactor casing and at the same time imparts a tangential movement to the solution or pulp.

The rotor of the separation device, defined by the discs 3 mounted on the hollow shaft 5, when rotating together with the working turbine 2 creates a counterpressure since each pair of the discs with clearances therebetween operates at the expense of the cohesive forces of metal and liquid, thus acting as a bladeless centrifugal turbine.

As the diameter of the working turbine 2 is somewhat larger than that of the separation discs 3, the pressure created by the turbine exceeds the pressure created by each pair of the discs. Therefore, an excess pressure is created within the casing, thus ensuring continuous squeezing of the pulp or solution through the clearances between the discs to the hollow part of the shaft and the continuous removal of the reaction products from the press.

Solid materials charged in the course of the process or resulting from the process, being rotated together with the liquid by the rotating rotor, are subjected to the action of centrifugal forces and thus are directed outwardly from the center to the maximum perimeter of the cylindrical casing, thus forming a thickened pulp through which the initial solution is squeezed. As a result of the thus created most favorable ratio of reacting materials, the processes are speeded up by tens and hundreds as compared with similar processes carried out in conventional apparatus.

During rotation, the particles of solid suspension are distributed proportionally to their masses, and the particles are separated according to their sizes. Newly formed finest particles of cement metals together with solution can be pressed through the clearances between the discs and taken to the following stage of the process, while the initial particles, being larger, cannot resist the centrifugal forces created by the rotating reactor and remain in the apparatus until their complete chemical utilization.

The high turbulence of the pulp within the reactor, absence of conditions for the appearance of laminar flow of the solution and solid suspension, and the optimum ratio of reacting substances reduce the values of diffusion resistance to the minimum, which in turn ensures the rapid proceeding of many of the chemical reactions at stoichiometric ratios of reacting substances.

When reactions in the reactor involve the gas phase, the behaviour of the initial components is characterized by the following:

The liquid phase rotates together with the rotor and is pressed through the clearance between the discs. The gas phase, whose mass is small, is displaced from the casing perimeter by the solution and, in a state of high dispersion, passes through the solution, making its way to the center of rotation center, i.e. the hollow part of the shaft through which the remnants of unused gas together with the solution are removed from the process. The gas is fed into the apparatus through a sleeve or inlet means 8 at a pressure somewhat exceeding that existing within the reactor. As a result of high dispersion and increased pressure, the rates of the reactions with the gas phase involved are much higher when compared with similar reactions carried out in conventional autoclaves and dispersers.

It is possible to carry out in the reactor the separation of immiscible liquids having slight differences in their specific weights, with the separated liquids being continuously removed from the process. The light fraction is removed through the hollow shaft, and the heavy fraction through a sleeve or outlet means 9 arranged on the perimeter of the reactor casing.

At present, the designs of reactors of various capacities and pressures are available for the following processes:

Cleaning of zinc solutions from copper, cadmium and antimony;

Obtaining thallium concentrate from the neutral solutions;

One-stage process for obtaining cadmium powder with 99.7% Cd content from the solution at stoichiometric consumption of zinc dust;

Hydrolytic cleaning of solutions from iron, arsenic, antimony, and concentrating the dispersed elements into hydrated cakes; and Oxidation of trivalent cerium with the view of its separation from the rest group of rare earths.

Apart from the above-mentioned processes, the reactors are successively used for many other chemical processes.

The average acceleration of the process rate achieved in the reactors if compared to that possible in apparatus of similar application is as follows:

For the processes of separating cement elements from the solutions, 300–400 times as much;

For the processes of oxidizing admixtures in neutral solutions, 100–200 times; and For the processes of dissolving substances in acids and alkalies, 200–300 times.

The productive capacity of the reactors is 100–500 litres of solution or pulp per litre of the reactor volume content and the pressure within the apparatus is 5 atms. at 1500 r.p.m. and about 8 atms. at 3000 r.p.m.

The above data shows that the centrifugal reactor is a universal apparatus for the acceleration and intensification of many chemical and hydrometallurgical processes.

This invention is not to be confined to any strict conformity to the showings in the drawings but changes or modifications may be made therein so long as such changes or modifications mark no material departure from the spirit and scope of the appended claims.

We claim:

1. A reactor for hydrometallurgical processes comprising a cylindrical casing, means operably related to the casing for feeding materials and discharging finished products into and from the casing, a rotor structure mounted in said casing, said rotor comprising a hollow shaft with apertures, separation discs mounted on the shaft with clearances between adjacent discs, said discs having bores aligned with said apertures to connect said hollow part of said shaft to said clearances between the discs.

2. The reactor according to claim 1, wherein the clearances between the separation discs are provided by intermediate rings for ensuring control of the clearance between said discs.

3. The reactor for hydrometallurgical processes according to claim 1 further comprising a turbine mounted on said shaft at the end at which the initial materials are fed to create a counterpressure during rotation of said separation discs.

4. The reactor according to claim 3, wherein the clearances arranged between the separation discs are provided by intermediate rings for insuring control of the clearance between said discs.

5. A reactor according to claim 1 wherein said apertures consist in radial holes selectively spaced in said hollow shaft, said radial holes communicating with longitudinal notches in said hollow shaft which are aligned the bores in the discs.

References Cited

UNITED STATES PATENTS

| | | | |
|---|---|---|---|
| 867,360 | 10/1907 | Haralson | 266—16 |
| 1,709,939 | 4/1929 | Hewitt | 233—20 |
| 2,102,297 | 12/1937 | Walch et al. | 233—28 |
| 2,500,100 | 3/1950 | Strezynski | 233—28 |
| 2,504,261 | 4/1950 | Hartstick | 233—28 |
| 2,767,841 | 10/1956 | Cram | 233—32 X |
| 2,917,230 | 12/1959 | Kaldewey | 233—28 X |
| 3,069,074 | 12/1962 | Moyer et al. | 233—32 |
| 3,133,880 | 5/1964 | Madany | 233—29 X |

FOREIGN PATENTS

| | | |
|---|---|---|
| 1,178,013 | 9/1964 | Germany. |

J. SPENCER OVERHOLSER, *Primary Examiner.*

R. S. ANNEAR, *Assistant Examiner.*